Sept. 1, 1925. 1,551,646
J. DAVIDSON
MACHINE FOR MOLDING FIRE KINDLER MATERIAL
Filed Jan. 13, 1925   2 Sheets-Sheet 1
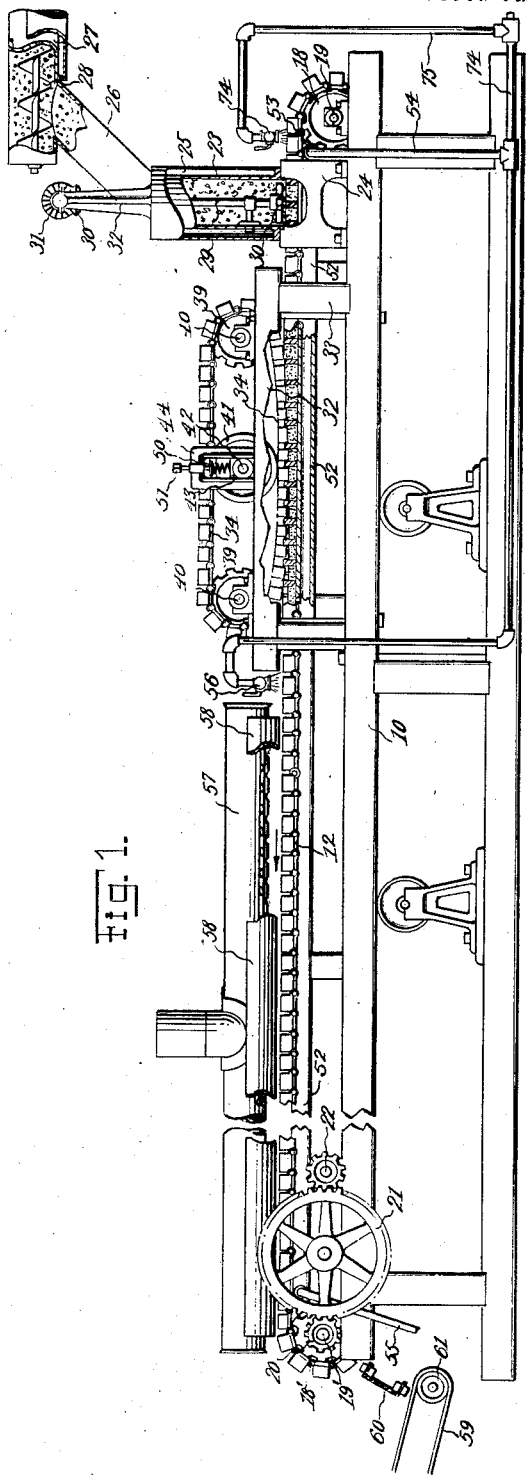
Inventor
Joseph Davidson.
By Cushman, Bryant & Darby
Attorneys Sept. 1, 1925. 1,551,646
J. DAVIDSON
MACHINE FOR MOLDING FIRE KINDLER MATERIAL
Filed Jan. 13, 1925    2 Sheets-Sheet 2
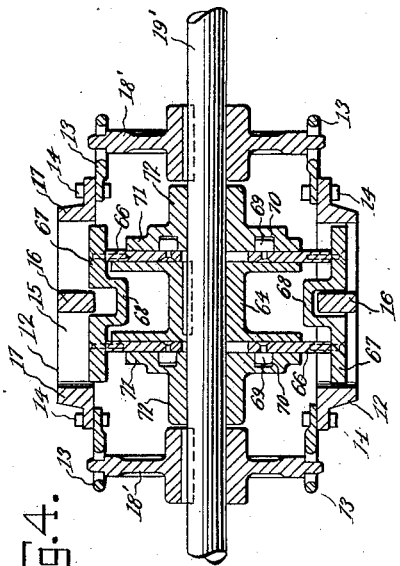
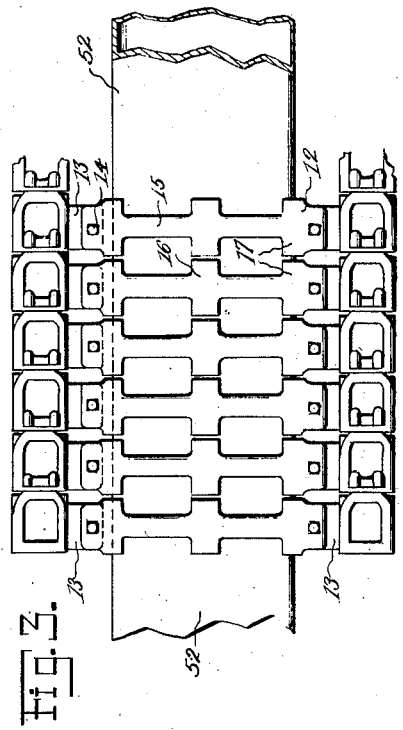
Inventor
Joseph Davidson.

Patented Sept. 1, 1925.

1,551,646

UNITED STATES PATENT OFFICE.

JOSEPH DAVIDSON, OF ATLANTA, GEORGIA, ASSIGNOR OF ONE-HALF TO THOMAS D. WOOD, OF FOUNTAIN INN, SOUTH CAROLINA.

MACHINE FOR MOLDING FIRE-KINDLER MATERIAL.

Application filed January 13, 1925. Serial No. 2,224.

*To all whom it may concern:*

Be it known that JOSEPH DAVIDSON, a citizen of the United States, residing at Atlanta, in the county of Fulton and State of Georgia, has invented new and useful Improvements in Machines for Molding Fire-Kindler Material, of which the following is a specification.

The present invention relates to molding machines, and more particularly to a machine for molding fire kindler briquettes of the character disclosed in the reissued Letters Patent to Clarence Y. Garrett, No. 15,851, dated June 3, 1924. The fire kindler of the patent is molded with relatively small pieces of wood or wood-like material coated and impregnated with resin, which serves as a binding agent due to its viscous adhesive character, the resultant briquette being relatively porous and serving to provide a flame sufficiently long and enduring to ignite coal.

In a copending application Serial No. 2223, filed January 13, 1925, there is disclosed a process and apparatus for producing material to be molded into briquettes, and the machine of the present application is intended, primarily, for use in connection with the molding of the material produced by the process and apparatus of the companion application An object of the invention is to provide a molding apparatus in which the heated and impregnated material may be automatically fed into the molds, compressed, suitably cooled, and then discharged with the particles adhesively united by the resin to retain the form imparted by the mold.

A further object of the invention is to provide improved means for cooling the material and for discharging the briquettes from the molds.

Other objects of the invention will become apparent as the description proceeds in connection with the accompanying drawings, wherein there is shown a preferred embodiment.

In the drawings:—

Figure 1 is a partial side elevational view.

Figure 2 is a side elevational view of the final conveyor, which receives the briquettes from the molds, and showing the ejector mechanism.

Figure 3 is a top plan view of the mold carrier.

Figure 4 is a sectional view on the line 4—4 of Figure 2.

Figure 5 is a face view of the traveling belt which compresses the material in the molds, and Figure 6 is a detail view showing the carrier for the ejector members.

Referring to the drawings for a more detailed description, 10 indicates an elongated frame, which serves as a support for an endless mold carrier, 11, constructed from transversely extending mold links 12 united at their ends by the open links 13 of sprocket chains, each sprocket chain link being secured to the mold links by securing bolts 14. Referring to the construction of the mold links, each individual link has one upstanding side wall 15, a central transverse wall 16, which divides each link into separate mold sections, and transverse end walls 17. In the present instance each link forms approximately half of two molds and the adjacent links unite to form two complete molds. The sprocket chains 13 traverse sprocket wheels 18 upon a shaft 19 at one end of the frame and sprocket wheels 18' upon a driven shaft 19' at the other end of the frame, the last mentioned shaft being driven through gears 20, 21, from a drive shaft 22, which may be rotated from any suitable source of power. The mold carrier travels in the direction of the arrow in Figure 1, and adjacent the sprocket wheels 18 is adapted to receive the material to be molded.

For this purpose a hopper 23 is supported by brackets 24 above the carrier and has its lower open end positioned directly above the mold carrier. The hopper is provided with a surrounding steam chamber 25 to maintain the resin upon the material in a viscous state and receives the material through a chute 26 from a steam jacketed trough 27 provided with a conveyor 28 by means of which material is fed to the chute 26, the lower end of the latter opening into the top of the hopper 23. A vertical shaft 29 extends through the hopper and carries a levelling member provided with radially extending arms 30, which serve to level the molds, the shaft being driven through gears 30 from a drive shaft 31 supported at one end by a bracket 32

The molds are automatically filled by material from the hopper, and are carried onwardly to a compressing mechanism, which, in the present instance, is supported by means of a frame 32 provided with depending legs 33, which rest upon the frame 10. The compressing means is in the form of an endless belt 34, comprising transversely extending links 35, united at their ends by the sprocket chains 36 secured to the links 35 by means of securing bolts 37. Each link 35 has two upstanding compressing blocks 38 which fit into the molds and serve to compress material therein. The compressor belt traverses sprocket wheels 39 mounted upon shafts 40 at opposite ends of the frame 32 and the blocks 38 are pressed into the molds by means of a downwardly pressed drum 41 positioned within the path of travel of the compressor chain upon a shaft 42 having bearings at its ends in slide blocks 43, the latter being downwardly pressed in U-shaped brackets 44 by means of springs 50, which may be tensioned by follower screws 51. It will be understood that the compressor drum 41 is supported at its opposite end in the same manner as illustrated in Figure 1. As the mold carrier is positively moved, the drum 41 presses the blocks 38 of the compressor chain downwardly into the molds (Figure 1) and the molds thus serve to move the compressor chain as the mold carrier travels.

It will be noted that the bottom of each mold is substantially open and there is positioned beneath the top horizontal run of the mold carrier a longitudinally extending platform 52, which serves as a bottom for the molds. The platform is hollow and at one end, 53, receives through a pipe 54, a cooling fluid which circulates through the platform and is discharged adjacent the opposite end thereof through a pipe 55. The platform thus assists in cooling the resin coated and impregnated material and hardening the briquettes. The cooling operation may be assisted by a spray head 56, which directs the cooling fluid downwardly upon the filled molds immediately after the material has been compressed. The material may be further cooled by means of a cooling agent, such as air, which is directed from a manifold pipe 57 having side plates 58 which form a hood serving to confine and prevent dispersion of the cooling medium before its full effect has been applied to the material in the molds.

The material is discharged from the molds adjacent the end of the horizontal run of the mold carrier. Referring to Figure 2, it will be noted that as the carrier passes over the sprocket wheels 18' the opposite side walls 15 of the molds, which are located upon separate links, separate and by means of an ejector mechanism the briquettes are deposited upon a travelling belt 59 to which they are directed by means of a deflector screen 60 interposed between the mold carrier and the belt. The belt 59 traverses drums 61 and is surrounded by a hood 62, which directs an additional cooling medium, such as air, upon the briquettes, which are carried upwardly through the hood, and then may be deposited upon a receiving table 63.

The mechanism for ejecting the briquettes from the molds and depositing them upon the belt 59 is illustrated in Figures 2 and 4. Upon the driven sprocket wheel shaft 19' and rotatable therewith is mounted a drum 64, the opposite sides of which have radial grooves 64' (Figure 6) carrying a plurality of radially extending arms 66 arranged in pairs with each pair supporting at its outer end plates 67, which are centrally recessed at 68 so that at the sides of the recess 68 the plates may be moved upwardly into the molds. Each arm 66 carries a follower 69, which fits in a track 70 upon one of a pair of track plates 71 having hubs 72, which surround the shaft 19 but are held stationary with respect thereto by means of brackets 73 secured to a frame cross member 10'. Each track is substantially circular, but eccentric with respect to the shaft 19, which constitutes the axis of the sprocket wheels and drum 18, so that as the drum 64 is revolved by shaft 19 the ejector members formed by the arm 66 and plate 67, starting with substantially the end of the horizontal run of the mold carrier, are gradually moved into the molds, and by the time the carrier reaches the position above the deflector plates 63 ejects the briquettes. The tracks then serve, as the rotation of the drum continues, to withdraw the ejector plates from the molds. The discharge operation is thus accomplished without stopping the carrier and as the same moves.

After the briquettes are discharged the mold carrier moves onwardly, and, if desired, the molds may be sprayed before they reach the hopper 23 with a cooling liquid as by means of a spray head 74, which is connected with a supply line 74' by means of a pipe 75. This preliminary spraying of the molds suitably chills them and materially assists in hardening the resin upon the material as it is fed into the molds.

Obviously numerous changes may be made in the construction illustrated and described without departing from the invention which is defined in the following claims.

I claim:—

1. In a machine of the class described, a traveling carrier, a series of molds, each mold having an open bottom, and a fluid cooled platform beneath one run of the carrier, said platform forming a bottom for the molds.

2. In a machine of the class described, a traveling carrier, a series of molds, each mold having an open bottom, and a hollow fluid cooled platform beneath one run of the carrier, said platform forming a bottom for the molds, and means for circulating a cooling means through said platform.

3. In a machine of the class described, a traveling carrier provided with a series of molds, each mold having an open bottom and a stationary member positioned beneath one run of said carrier for a substantial distance, said member forming a bottom for the molds and being adapted to contain a cooling fluid.

4. In a machine of the class described, a traveling carrier provided with a series of molds, each mold having an open bottom, a stationary member positioned beneath one run of said carrier for a substantial distance, said member forming a bottom for the molds and being adapted to contain a cooling fluid, and means for circulating a cooling medium through said member.

5. In a machine of the class described, a traveling carrier provided with a series of molds, each mold having an open top, means for filling the molds, means for spraying the molds with a cooling liquid both before and after they are filled, and cooling means positioned above and below the carrier adapted to cool the filled molds for a substantial distance through their path of travel while filled.

6. In a machine of the class described, a traveling carrier provided with a series of molds, each mold having an open bottom, means for filling the molds, and cooling means closing the bottom of each mold and extending for a substantial distance through the path of travel of the filled molds.

7. In a machine of the class described, a travelling carrier provided with a series of molds, and ejector means in association with said carrier comprising a stationary track, ejector members adapted to fit into the molds and having track followers, and means for moving the ejector members along the track, said track being arranged to move the ejector members bodily and in a substantially radial direction into and out of the molds.

8. In a machine of the class described, a travelling carrier provided with a series of molds, and ejector means in association with said carrier comprising a stationary track, ejector members adapted to fit into the molds and having track followers, and means for moving the ejector members along the track, said track being arranged to move the ejector members bodily and in a substantially radial direction into and out of the molds and a portion of said track substantially paralleling the path of the carrier, whereby the ejector members may be operated without stopping the carrier.

9. In a machine of the class described, a traveling carrier provided with a series of molds, and ejector means positioned within the path of travel of the carrier, said ejector means comprising an endless stationary track, ejector members extending substantially radially from said track, and each having a track follower, and means for moving the ejector members along the track, said track being arranged to move the ejector members into and out of the molds as the carrier moves.

10. In a machine of the class described, a traveling carrier provided with a series of molds, and ejector means positioned within the path of travel of the carrier, said ejector means comprising an endless stationary track, ejector members extending substantially radially from said track and each having a track follower, means for moving the ejector members along the track, said track being arranged to move the ejector members into and out of the molds without stopping the carrier.

11. In a machine of the class described, an endless traveling carrier provided with a series of molds, said carrier having a horizontal run, sprocket wheels traversed by said carrier at one end of said run, ejector means in association with the carrier at said end of the horizontal run comprising a substantially circular stationary track arranged eccentrically with respect to the axis of said sprocket wheels, ejector members adapted to fit into the molds and having track followers, and means for moving the ejector members along the track, said track being arranged to move said members into and out of the molds as the carrier moves.

In testimony whereof I have hereunto set my hand.

JOSEPH DAVIDSON.